United States Patent [19]

Bilbro et al.

[11] E Re. 29,332

[45] Reissued Aug. 2, 1977

[54] PIPE HEAT TRANSFER ASSEMBLY AND METHOD OF MAKING SAME

[75] Inventors: James E. Bilbro, Whitman County, Wash.; Ben C. Johnson, Jr., Comal County, Tex.

[73] Assignee: Thermon Manufacturing Company

[21] Appl. No.: 526,895

[22] Filed: Nov. 18, 1974

Related U.S. Patent Documents

Reissue of:

[64] Patent No.: 3,834,458
Issued: Sept. 10, 1974
Appl. No.: 370,396
Filed: June 15, 1973

[51] Int. Cl.[2] ..... B23P 15/26

[52] U.S. Cl. ..... 165/164; 29/157.3 R; 138/111; 156/199; 165/180; 165/185; 219/301; 219/535; 264/174; 264/271; 264/279

[58] Field of Search ..... 219/535; 138/111, 112; 165/164; 264/174, 271, 279; 156/209, 199, 196

[56] References Cited

U.S. PATENT DOCUMENTS

| | | | |
|---|---|---|---|
| 1,216,313 | 2/1917 | Heller | 219/535 X |
| 2,687,626 | 8/1954 | Bartlowe | 165/164 X |
| 2,812,412 | 11/1957 | Fulham | 219/535 X |
| 2,982,992 | 5/1961 | Brown et al. | 219/535 X |
| 3,175,282 | 3/1965 | Meeker et al. | 29/452 X |
| 3,331,946 | 7/1967 | Bilbro | 165/164 X |
| 3,834,458 | 9/1974 | Bilbro et al. | 165/164 |

FOREIGN PATENT DOCUMENTS

| | | | |
|---|---|---|---|
| 1,600,601 | 4/1970 | Germany | 165/164 |
| 29,490 | 11/1917 | Norway | 219/535 X |

*Primary Examiner*—Albert W. Davis, Jr.
*Assistant Examiner*—Sheldon Richter
*Attorney, Agent, or Firm*—Pravel, Wilson & Gambrell

[57] ABSTRACT

Pipe heat transfer assembly and method of making same, wherein a strip of heat transfer material is pre-shaped to a solid flexible form for closely [comforming] *conforming* with a heat transfer element for either heating or cooling and which is also pre-shaped to fit closely within an external channel member, whereby the entire assembly may be more easily and rapidly installed with unskilled labor in the field on a pipe to be heated or cooled, using retaining band means as the holding means for the assembly, with the assurance of complete coverage of the heat transfer element by said heat transfer material so as to eliminate air gaps. The heat transfer material may be pre-shaped by molding or extruding, with the heat transfer element embedded therein during such pre-shaping, or with a preformed space for the heat transfer element. The heat transfer material is solid, capable of retaining its shape, and remains flexible, after pre-shaping, within the normal temperature range to which the material is subjected, preferably within a range of from about 10° F. to about 120° F.

11 Claims, 4 Drawing Figures

PIPE HEAT TRANSFER ASSEMBLY AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

The field of this invention is heat transfer apparatus and methods, particularly for heating or cooling from a heat transfer element disposed externally on a pipe. The term "pipe" as used herein includes tubes, conduits or other members, the contents of which is to be heated or cooled by the heat transfer element.

U.S. Pat. No. 3,331,946 discloses a heat transfer assembly wherein the heat transfer material was placed in a channel member in a putty-like or plastic state. This was accomplished by pressing the channel member or applicator downwardly on top of the heat transfer material with the heat transfer element embedded therein. Although the objective was to eliminate undersirable air gaps in the heat transfer material and between the heat transfer element and the heat transfer material, is has been found that the efficiency and success depends upon the personnel handling the putty-like material, and therefore, the elimination of air gaps has been difficult and not dependable.

SUMMARY OF THE INVENTION

The present invention relates to new and improved heat transfer assembly and method of making same, wherein the elimination of air gaps is more positively accomplished, and errors due to personnel are more easily avoided. The heat transfer material, instead of being applied in a putty-like form in a channel is pre-shaped, by molding or extruding, usually with the heat transfer element embedded therein, or shaped with a cavity to closely conform to the heat transfer element. The heat transfer material is also pre-shaped externally to closely conform to the internal area of the channel member which is applied over the heat transfer material and element at the job site where the pipe to be heated or cooled is located. The invention furter eliminates either the on the job site handling of the putty-like heat transfer material or the shipping of the channel members prefabricated with the heat transfer material and element, thereby facilitating shipping and handling as compared to the prior art.

DESCRIPTION OF THE PREFERRED EMBODIMENTS

Figure 1:
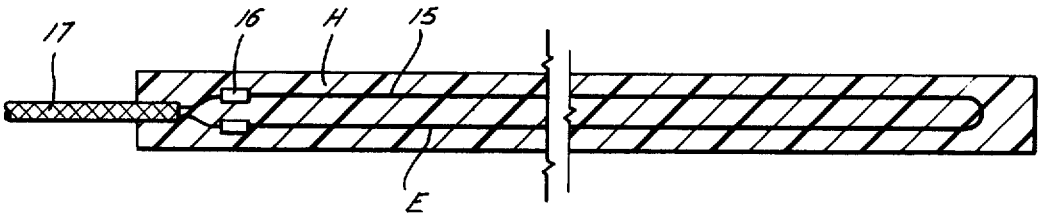
FIG. 1 is a horizontal sectional view illustrating one embodiment of the pre-shaped and pre-formed heat transfer material with a heat transfer element embedded therein.

The present invention relates to a pipe heat transfer assembly generally designated with the letter A (FIG. 2) which is adapted to be mounted upon a pipe P. The term "pipe" is defined above and is intended to include various types of conductors or members for heat transfer purposes. Briefly, the heat transfer assembly includes a pre-shaped heat transfer material strip H, a heat transfer element E, a channel member C, and clamping members M for securing the assembly on the pipe P.

Considering the invention more in detail, the heat transfer material H is either extruded or molded, using a material which is capable of being preshaped, but which becomes solid and flexible and remains in such solid, flexible state so as to retain its preshaped form. The external shape of the heat transfer material H conforms to and preferably is identical with the cavity or recess 10 formed in the channel member C, and also the portion of the pipe P designated 11 (FIG. 3) which is defined by the channel member C. Since the heat transfer material H is flexible and resilient, it will be understood that the exact configuration of the external surface of the heat transfer material H does not have to be identical to the surfaces of the channel member C defining the internal recess or cavity 10 and the external pipe portion 11 since the material may yield and assume such shape after being confined on the pipe P by the channel member C. In any event, the heat transfer material H does have a cross-sectional shape which generally is substantially the same as that defined by the internal cavity or recess 10 of the channel member 10 and the pipe portion 11 so as to substantially fill such area without any air gaps or spaces therebetween.

It is also important to note that the extruding or molding of the heat transfer material H may be accomplished at a point remote from the field application of such heat transfer material H to the pipe P so that the material may be extruded or molded under enough pressure and force to assure that air pockets or bubbles or gaps within the material H are virtually eliminated from the strip of material H. This is a decided advantage over the application of the heat transfer material H in a putty-like or plastic form as in the prior art.

In the normal use of the present invention, the heat transfer element E is an electrical resistance wire 15 (FIG. 1) which is connected by any suitable means to an electrical terminal 16 and a lead-in wire 17, leading to a source of electrical power. The heat is provided by the element E in the known manner of electrical resistance heaters and such heat is transferred through the heat transfer material H to the pipe P which has a liquid or other material therein which is to be heated or maintained in a heated condition by the heat from the heat transfer element E.

Preferably, the heat transfer element E is passed through the extruder during the extruding of the heat transfer material H so that the material H and the element E are molded or are extruded as a unit as illustrated in FIG. 1. This provides for the assurance that the element E is embedded in the heat transfer material H so that air spaces or pockets around the heat transfer element E is avoided.

Figure 2:
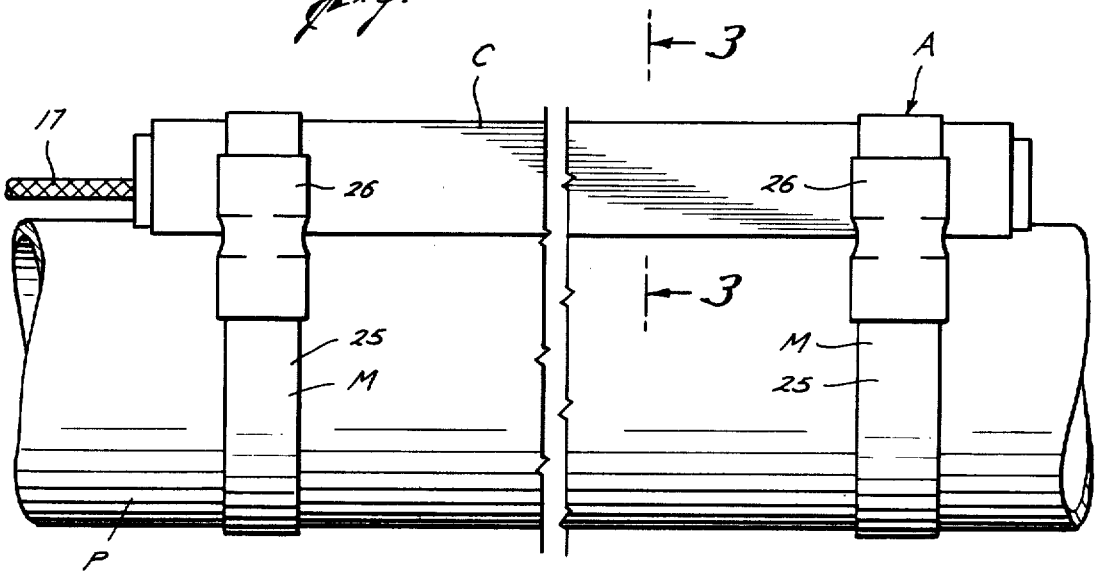
FIG. 2 is a view illustrating the pre-shaped and pre-formed heat transfer material and heating element confined by a channel member with clamping straps holding the assembly on a pipe for heat transfer purposes.
Figure 3:
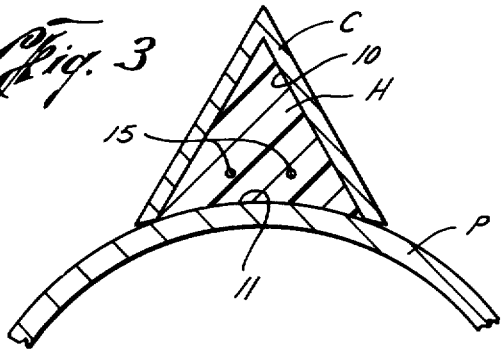
FIG. 3 is a vertical sectional view taken on line 3—3 of FIG. 2.
Figure 4:
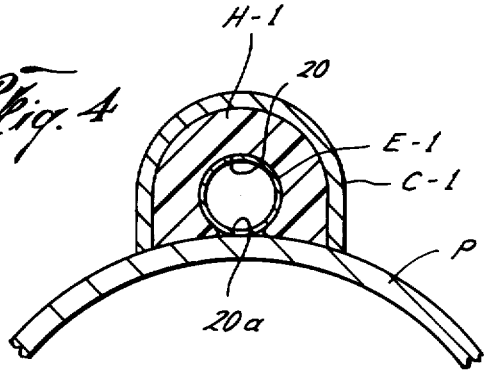
FIG. 4 is a vertical sectional view similar to that of FIG. 3, but illustrating a modified form of the invention, wherein the channel member and the components thereof are formed in a different shape from that of FIG. 3 to illustrate that the invention is not limited to any particular shape, and further showing a fluid conducting tube as the heat transfer element rather than the electrical resistance element of FIG. 3.

At this point, it should be noted that the heat transfer element E is not limited to an electrical resistance heater element such as shown in FIGS. 1-3, and therefore, a modified form of the invention is shown in FIG. 4, wherein a heat transfer element E-1 is disposed within heat transfer material H-1 which in turn is confined by a modified channel member C-1.

In such modified form of the invention illustrated in FIG. 4, the heat transfer material strip H-1 has the same general appearance as the strip H, except that the material strip H-1 is molded or extruded with a recess or cavity 20 therein for receiving the heat transfer element E-1, or any other heat transfer element such as the heat transfer element E. The recess or cavity 20 is predetermined so that when the heat transfer material H-1 is assembled with the heat transfer element E-1 or E, the material H-1 closely conforms to and effectively embeds the heat transfer element within the heat transfer material.

It should also be noted that although the heat transfer element E-1 is shown as being inserted from the bottom of the strip H-1 through a longitudinal space 20a for receiving the element E-1 in the recess or cavity, the material H-1 may be molded or extruded so that the heat transfer element E-1 or E is inserted longitudinally, thereby providing some of the heat transfer material between the element E-1 or E and the external surface of the pipe P.

The channel member C-1 has been shown with a different shape from the channel member C to illustrate that the invention is not limited to any particular shape of channel member or any particular external shape of the heat transfer material H or H-1. The channel members C and C-1 are preferably formed of metal or any other relatively strong material capable of confining the heat transfer material and also retaining its position on the pipe P.

For the purposes of holding the entire assembly A on the pipe P, the assembly includes the clamping bands M which are preferably of any conventional type such as steel bands 25 which extend around the pipe P and the channel member C or C-1 and which are affixed by bending a connector 26 to the ends of the band 25, as is well known. Any other clamping arrangement may be utilized so long as it retains the channel member C, the heat transfer material H and the heating element E, or the alternate form shown in FIG. 4, on pipe P in the selected position.

It should also be understood that the two clamping members M illustrated are for illustration purposes only and a plurality of such members M may be employed, depending upon the length of the channel member C or C-1 which is being used. Also, it should be understood that more than one channel member may be employed with each of the strips H, or alternatively, more than one of the strips H may be employed with a single channel member.

Although the invention is illustrated with the electrical resistance heating element E for heating purposes, the modification shown in FIG. 4 illustrates the heat transfer element E-1 which may be used for either heating or cooling by passing the appropriate fluid therethrough.

Although the invention is not limited to any particular heat transfer material, by way of example, the strip H or H-1 may be formed of a material having the following general formula:

| | |
|---|---|
| Thermoplastic Binder | 10% - 80% (by weight) |
| Graphite (or other heat-conducting material) | 20% - 90% |

The thermoplastic binders which may be used may be those in the broad classification of rubbers, such as butyl rubber, silicone rubber, nitrile, polyurethane, and acrylic resins. Also, the thermoplastic materials could include the polyamides and the polyamide copolymers, as well as the fluoroplastics, the polyethylenes and the polysulfides.

The thermoplastic material would have a softening point of about 95° C. and a specific gravity of about 0.97. In any event, the heat transfer material in the strip H or H-1 would retain its shape and would not flow during exposure to the normal temperature range from about 10° F. to about 120° F. Also, the material remains flexible within such temperature range.

In the preferred embodiment of this invention, the heat transfer material in either the strip H or the strip H-1 has the following composition:

| | |
|---|---|
| Polyamide Resin softening point 160° - 170° C. specific gravity 0.98 | 35% - 45% (by weight) |
| N-ethyl-o and p-Toluenesulfonamides | 9% - 11% |
| Graphite (or other heat-conducting material) | 40% - 50% |
| Paraffin wax (melting point 180°-190° F.) | 4% - 6% |

All of the above percentages are by weight. In the foregoing example, the percentages are set forth as a range, but a specific product may have 40% of the polyamide resin, 10% of the sulfonamides, 45% of the graphite and 5% of the wax.

It should be understood that the foregoing are merely set forth by way of example and not by way of limitation.

The foregoing disclosure and description of the invention are illustrative and explanatory thereof, and various changes in the size, shape, and materials as well as in the details of the illustrated construction may be made without departing from the spirit of the invention.

We claim:

1. A method of making a pipe heat transfer assembly adapted for mounting on a pipe or the like having a channel member with heat transfer material and a heat transfer element in the channel member, the improvement comprising the steps of:

preshaping heat transfer material to a solid flexible shape-retaining elongated strip prior to mounting said heat transfer material on a pipe or the like;

embedding a heat transfer element in said heat transfer material prior to mounting said heat transfer material on such pipe or the like; and, said preshaping including shaping the external surface of said strip to closely conform to the interior of the channel member and to such pipe or the like to which the assembly is to be applied.

2. The method set forth in claim 1, wherein said embedding includes the steps of:

preforming said heat transfer material with a cavity for said heat transfer element; and inserting said heat transfer element into said cavity after the preforming thereof.

3. The method set forth in claim 1, wherein said heating element includes:

a plurality of electric resistance heating wires extending longitudinally of the strip and completely surrounded by said heat transfer material.

4. The method set forth in claim 1, wherein said heating element includes:

a tube for a heat transfer fluid to flow therethrough.

5. The method set forth in claim 1, wherein:

said heat transfer material, after said preshaping, remains flexible without any significant flow within a temperature range of from about 10° F. to about 120° F.

6. The method set forth in claim 1, including:

positioning the channel member over said preshaped heat transfer material with the heat transfer element therewith; mounting said pipe heat transfer assembly on such pipe or the like; and thereafter placing clamping bands around the channel member and such pipe or the like on which the assembly is disposed to secure the assembly to the pipe.

7. The method set forth in claim 1, wherein:

said heat transfer element is embedded in said heat transfer material during the preshaping thereof.

*8. A method of making a pipe heat transfer assembly adapted for mounting on a pipe or the like having a channel member with heat transfer material and a heat transfer element in the channel material, the improvement comprising the steps of:*

*preshaping heat transfer material to a solid, flexible shape-retaining elongated strip prior to mounting said heat transfer material on a pipe or the like;*

*preforming said heat transfer material with a cavity for a heat transfer element;*

*inserting said heat transfer element into said cavity after the preforming thereof; and*

*said preshaping including shaping the external surface of said strip to closely conform to the interior of the channel member and to said pipe or the like.*

*9. The method set forth in claim 8, wherein said heating element includes:*

*a tube for a heat transfer fluid to flow therethrough.*

*10. A method of insulating a heat transfer element which is mounted on a pipe or the like for more effective heating or cooling of said pipe, comprising the steps of:*

*preshaping heat transfer material to a solid shape-retaining elongated strip having a preformed space conforming to the shape of a heat transfer element;*

*preshaping the external surface of said strip to conform to the interior of a channel member;*

*mounting said preshaped heat transfer material over said heat transfer element so that said heat transfer element is positioned in said preformed space; and*

*positioning said channel member over said heat transfer material.*

*11. A method of making a heat transfer assembly adapted for mounting on a pipe or the like having a channel member with heat transfer material and a heat transfer element in the channel member, the improvement comprising the steps of:*

*preshaping heat transfer material to a solid, flexible shape-retaining elongated strip prior to mounting said heat transfer material on a pipe or the like;*

*embedding a heat transfer element in said heat transfer material; and*

*said preshaping including shaping the external surface of said strip to closely conform to the interior of the channel member and to said pipe or the like.*

* * * * *